United States Patent [19]

Shawcross et al.

[11] 4,420,121
[45] Dec. 13, 1983

[54] ROLL FILM LOOPING AND GUIDING APPARATUS

[75] Inventors: Alfred L. Shawcross, Lima; Frederick J. Ramsey; Arnold A. Raymond, both of Rochester, all of N.Y.

[73] Assignee: Bausch & Lomb Incorporated, Rochester, N.Y.

[21] Appl. No.: 298,971

[22] Filed: Sep. 3, 1981

[51] Int. Cl.³ .................... G03B 1/04; B65H 27/00
[52] U.S. Cl. ................................ 242/181; 226/189; 242/76
[58] Field of Search ............... 242/76, 179–181; 352/129, 130, 159; 226/21, 189; 355/5, 6, 11, 21, DIG. 2; 362/97

[56] References Cited

U.S. PATENT DOCUMENTS 3,954,213 5/1976 Andersen .................. 226/7

*Primary Examiner*—Leonard D. Christian
*Attorney, Agent, or Firm*—John S. Norton; Bernard D. Bogdon

[57] ABSTRACT

Apparatus for supporting and accumulating roll film on a film scanning stage, supported on a high intensity light table. The apparatus includes supply and take-up film reels and a pair of looping and guiding assemblies, all of which are secured to the scanning stage. The looping and guiding assemblies are aligned with the film reels and offset from each other in two orthogonal directions to position roll film in a zig-zag pattern on the scanning stage. The position of at least one of the assemblies is adjustable to vary the amount of film accumulated between the two assemblies.

10 Claims, 6 Drawing Figures

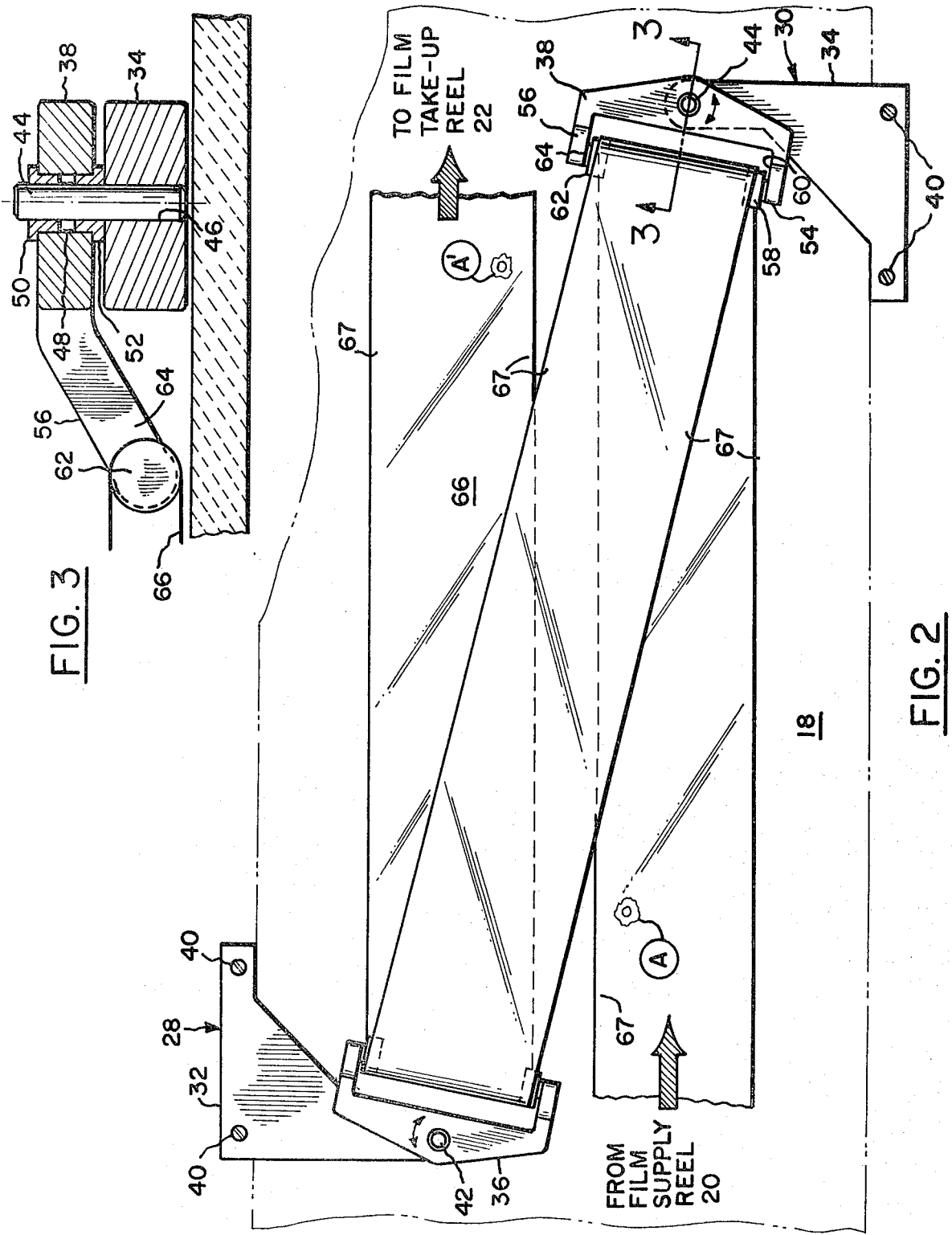

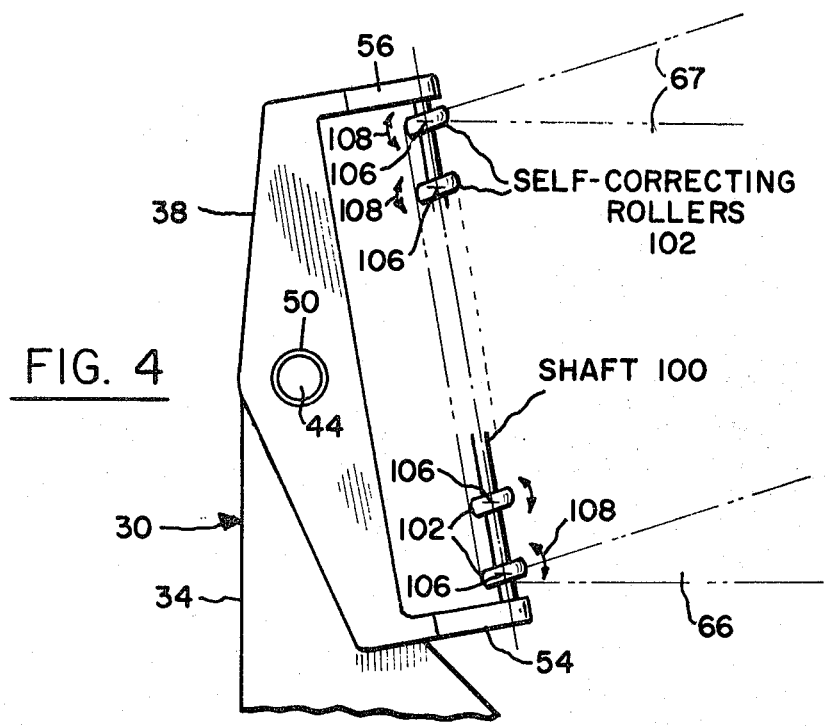
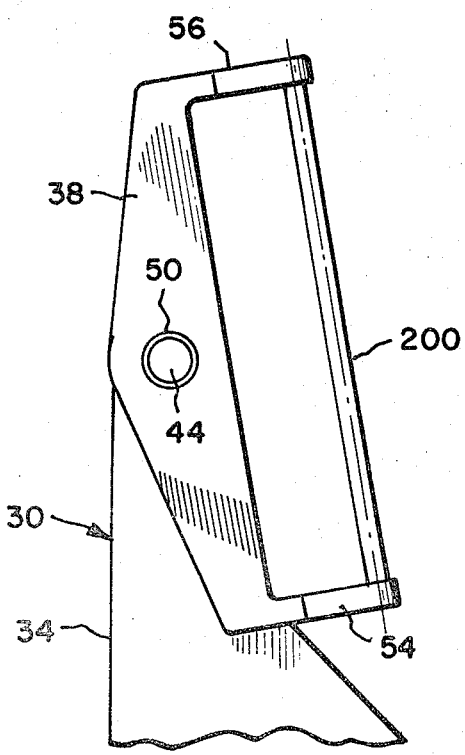
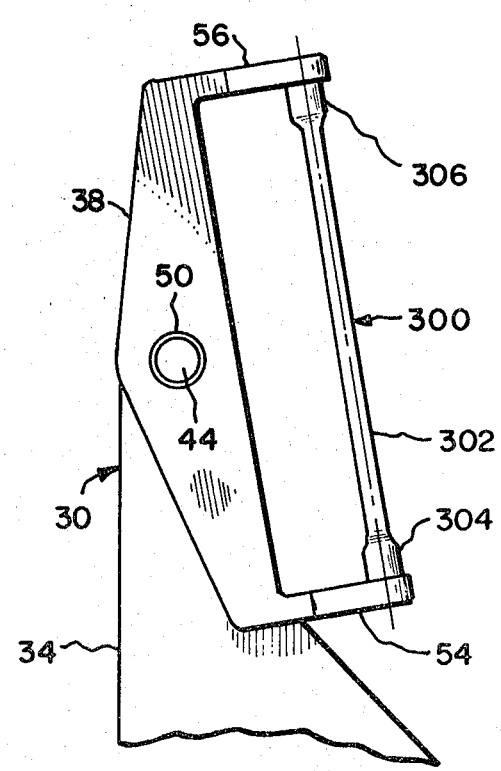

ROLL FILM LOOPING AND GUIDING APPARATUS

DESCRIPTION OF THE PRIOR ART

In aerial photography many different film formats are available, including panoramic film. When such film is used in a panoramic camera, such as the Itek Optical Bar Panoramic camera which sweeps back and forth through an arc of approximately 90 degrees, a 5"×60" image is exposed. Certain areas of successive exposures overlap and when viewed in stereo, can be used to determine terrain features and elevations for general feature analysis and for mapping.

Analysis and interpretation of aerial photography requires the use of equipment developed especially for viewing the photographs in stereo. Such equipment may include a stereo optical system, such as the Bausch & Lomb Zoom 240 stereoscope which has rhomboid arms for positioning the optics over the film, a light table, and a film scanning stage across which the film to be viewed is moved. Since the field of view of a micro-stereoscope is significantly smaller than the film format size, either the micro-stereoscope or the scanning stage must be movable so that all areas of interest may be viewed. The rhomboid arms are also movable to allow the optics to be individually positioned over identical points on consecutive exposures on the film.

With micro-stereoscopes, such as the Bausch & Lomb Zoom 240, the vertical center lines of the optics in the rhomboid arms can only be separated from each other by a maximum distance of, approximately, 15". With a Bausch & Lomb Zoom 500 stereoscope, the maximum separation is in the order of 23". Corresponding areas on consecutive exposures produced by the sweeps of a panoramic camera are, approximately, 60" apart. In order to view such exposures with such microstereoscopes without cutting the film, a split format light table such as described in U.S. Pat. No. 3,606,693 has been utilized. In this apparatus, the table is split in the middle and a series of rollers are positioned beneath the split to take up/accumulate excess film. The film being viewed is threaded down the split in the light table and around the series of rollers. This, in effect, moves the portions of the film of interest under the rhomboid arms so that they can be viewed in stereo.

Illumination available from the above referenced split format table is not always adequate because extended source illumination, such as cold cathode or fluorescent grids, are required and these types of sources are limited to about 5,000 ft.-lamberts, which is too low for some viewing situations. High magnification and high density film requires more light. In order to overcome this deficiency, a light table which has high intensity, delivering illumination on the order of 50,000 to 200,000 ft.-lamberts, was developed and is disclosed in U.S. Pat. No. 4,220,982. This high intensity system, however, does not allow for splitting the light table. Thus, stereo viewing is limited to portions of adjacent exposures which are separated by a distance of no more than, approximately, 15" to 23", the maximum spread of the rhomboids of typical micro-stereoscopes used to view the film. Because of this problem, use of high intensity light tables with, for instance, 5"×60" panoramic exposures has been limited.

One proposed method is to use a wind-up system wherein a forked arm resembling a tuning fork is positioned on the film, at the midpoint of the conjugate stereo image separation. The film passes through the center of the fork. This fork is then rotated about the axis of its handle and the film is wound up symetrically around the forks. This method can accumulate an adequate supply of film but must be carefully positioned on the film prior to winding so that the desired viewing areas end up properly positioned relative to the optics. Also, once wound up, film transport is not possible.

The film looping and guiding system of the present invention solves the foregoing problems by providing a system for positioning the complementary areas being viewed on adjacent exposures close together without splitting the light table and sacrificing high intensity illumination. Also, since the film is not wound up on a fork, it can be transported from one take-up reel to the other, allowing complete freedom of selecting and positioning viewing areas. The film looping and guiding system is totally mounted above the light table and, consequently, compatible with the above referenced high intensity light table.

SUMMARY OF THE INVENTION

A film supporting and accumulating system for use with a high intensity light table includes a pair of film looping and guiding assemblies pivotally mounted to a planar support surface, preferably a film scanning stage. The film is looped and guided through two consecutive 180 degree arcs by the assemblies which are offset from each other a distance at least equal to the width of the film being viewed. The relative positions of the assemblies may be adjusted. The assemblies may also include cylindrical non-rotating surfaces across which the film is drawn, including a pair of studs.

BRIEF DESCRIPTION OF THE DRAWINGS

FIG. 2 is a top plan view of the film looping and guiding apparatus;

FIG. 3 is an enlarged sectional view taken along line 3—3 of FIG. 2; and

FIGS. 4–6 are partial plan views of further embodiments of one of the film looping and guiding assemblies.

DETAILED DESCRIPTION OF THE PREFERRED EMBODIMENT

Figure 1:
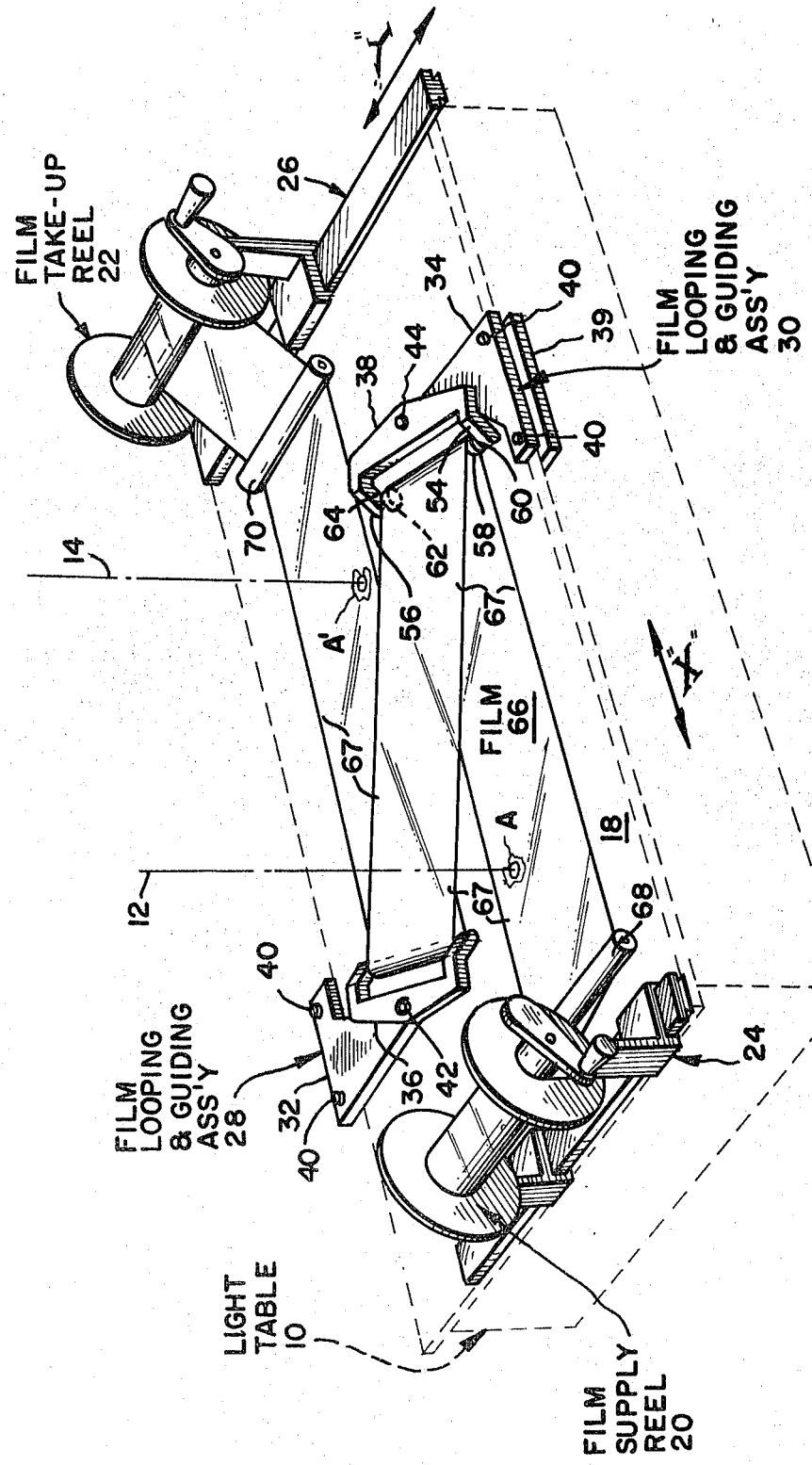
FIG. 1 is a perspective view of a high intensity light table incorporating the film looping and guiding system of the present invention.

A high intensity light table 10 for use in analyzing aerial photographs is disclosed in U.S. Pat. No. 4,220,982. Such tables are designed for use with micro-stereoscopes such as the Bausch & Lomb Zoom 240 stereoscope or the Bausch & Lomb Zoom 500 stereoscope. Such micro-stereoscopes have systems which include a pair of rhomboid arms. The vertical portions of the optical axes of these rhomboid arms are shown in FIG. 1 and are referred to by numerals 12 and 14. The light table 10 has a conventional X-Y scanning state attached to it for providing X and Y-adjustment, which enables the film support surface 18 to be moved bidirectionally relative to a fixed micro-stereoscope. The rhomboid arms of such a micro-stereoscope may be moved about until their axis, as indicated by center lines 12 and 14, are properly positioned with respect to the particular sections of the aerial photographs being viewed.

A pair of reel mechanisms 20 and 22 are mounted opposite one another on the stage 16. The reel mechanisms operate to deliver the film from the source reel 20 across surface 18 to the takeup reel 22. The film reel mechanisms 20 and 22 may be adjustably mounted to stage 16 by, for instance, dovetail slides 24 and 26.

In order to be able to view corresponding areas of successive 5"×60" exposures produced during successive sweeps of a panoramic camera, as indicated by A and A' in FIG. 1, on a high intensity light table capable of delivering from 50,000 to 200,000 ft.-lamberts and having no split in the surface of the light table, a pair of film looping and guiding assemblies 28 and 30 are provided. These film looping and guiding assemblies, which are offset from each other in both the X and Y directions, generally comprise mounting brackets 32 and 34, and pivoting brackets 36 and 38, respectively. The mounting brackets 32 and 34 may be attached to the stage 16 by, for instance, clamp 39 held in place by screws 40. By simply loosening screws 40, the mounting brackets 32 and 34 may be adjusted in the X-direction along the stage 16.

The pivoting brackets 36 and 38 are attached to mounting brackets 32 and 34 by pivot pins 42 and 44 respectively. By referring to FIG. 3, it will be seen that pin 44 is pressed into bore 46 in mounting bracket 34. Pivot bracket 38 has a bore 48 which is sized to accept top bushing 50 and bottom bushing 52. The I.D. of the bushings is dimensioned to allow a slip fit of pin 44. The mounting bracket 34 thus holds pivot pin 44 securely while allowing pivot bracket 38 to rotate about pin 44.

Pivot bracket 38 has at its outer end a pair of opposed arms 54 and 56 which extend away and down from bracket 34. A stud 58 is mounted to the inner surface 60 of arm 54. Another stud 62 is similarly mounted to inner surface 64 of arm 56. The studs 58 and 62 thus are positioned to face one another. The studs are, further, coaxial. The surface of the studs must be smooth, such as would be accomplished, for instance, by chrome plating.

As assembly 28 is structurally and functionally identical to assembly 30, a detailed description thereof has been omitted.

In operation the film 66 to be viewed is threaded from supply reel 20 under roller 68 and across surface 18 to film looping and guiding assembly 30. The film 66 is then threaded up from the table and looped approximately 180 degrees around studs 58 and 62 of pivot bracket 38, as best seen in FIGS. 1 and 3. The studs engage only the edge portion 67 of the film and do not touch or disturb the emulsion portion. The film 66 is then threaded back across and above the surface 18 to engage and loop approximately 180 degrees about the corresponding studs on pivot bracket 36 of film looping and guiding assembly 28. Finally, the film is threaded under roller 70 and onto takeup reel 22.

The film supply reel 20 and the takeup reel 22 are offset in the Y-direction from each other on the light table by a distance which would be approximately equal to, or greater than, the width of the film 66 being viewed. By referring to FIGS. 1 and 3 it will be noticed that the path taken by the film 66 across the surface 18 resembles an "S" or zig-zag pattern.

The pivoting feature of the assemblies 28 and 30 permit the film 66 to accomplish this looping by automatically pivoting when the film is looped around them and directed to either another pivoting assembly or to a takeup reel. The dovetail slides 24 and 26 allow for easy adjustment of the film reels so that the film offset in the Y-direction may be readily accomplished. Each reel may be slid along the dovetail until its desired and proper position has been reached.

Once the film 66 is in position across the surface 18, the rhomboid arm mounted optics may be positioned. Simply, the optical axis 12 of one rhomboid arm would be positioned over the film so that area A is under observation. The other rhomboid arm would then be moved about until its optical axis center line 14 is lined up over the corresponding area A' so that a conjugate image is formed. If both areas A and A' cannot be positioned under the rhomboid arms, the distance therebetween is adjusted by moving assembly 30 in the X-direction to adjust the amount of film accumulated between assemblies 28 and 30. For an 18"×58" scanning stage, assemblies 28 and 30 can be adjusted to accomodate conjugate image separations in the range of 45" to 60".

In another embodiment of the invention, as best seen in FIG. 4, a fixed shaft 100 is mounted between arms 54 and 56 of pivot bracket 38. A series of self-correcting roller bearins 102 are mounted to the fixed shaft. The self-correcting rollers 102 are pinned to shaft 100 to pivot about axes 106 in the direction indicated by arrows 108. As the film 66 is looped 180 degrees around the self-correcting rollers 102, they automatically pivot about their axes 106 to align themselves substantially with the direction the film 66 is being moved. This would make for, essentially, friction free contact between the film and the rollers.

A further embodiment of the invention, as seen in FIG. 5 comprises a pivot bracket 38 which would simply have a single round shaft 300 mounted between the arms 54 and 56. The shaft would be fixed and not allowed to rotate. Alternatively, as seen in FIG. 6, a fixed round shaft 300 could have a stepped-down middle portion 302 which would enable the film 66 to be contacted by the shaft only at the shaft's outer portions 304 and 306. Accordingly, the film would only be contacted at its non-emulsion fixed outer edges.

The drawings and accompanying drawings have shown and described several embodiments of the present invention. However, it will be apparent to any of those having skill in the art that various changes may be made thereto without departing from the spirit or scope of the invention.

What we claim is:

1. Apparatus for supporting and accumulating roll film, comprising:

(a) means for supporting roll film for viewing thereof; and (b) first and second assemblies pivotally mounted to said film supporting means, said assemblies including means for looping and guiding roll film through two consecutive 180 degree arcs, said assemblies being offset from each other at least a distance equal to the width of roll film being viewed.

2. The apparatus as set forth in claim 1, wherein each of said first and second looping and guiding assemblies includes a bracket to which said looping and guiding means is pivotally connected, said bracket including means for securing each said assembly to said support means.

3. The apparatus as set forth in claim 2, wherein said brackets are secured to said support means at locations which are offset from each other in two orthogonal directions, the offset in one direction being equal to or greater than the width of roll film being accumulated.

4. The apparatus as set forth in claim 3, wherein at least one of said brackets is movable relative to said support means to vary the distance between said first and second looping and guiding assemblies and, hence, the amount of film accumulated therebetween.

5. The apparatus as set forth in claim 2, wherein at least one of said first and second looping and guiding means includes a non-rotating cylindrical surface over which roll film is drawn.

6. The apparatus as set forth in claim 5, wherein the central portion of said cylinder is smaller in diameter than the end portions, whereby film is drawn only over said end portions.

7. The apparatus as set forth in claim 2, wherein at least one of said first and second looping and guiding means include a pair of opposing coaxial studs.

8. The apparatus as set forth in claim 2, wherein at least one of said first and second looping and guiding means include a pair of bearings and means for supporting said bearings so that they align with the direction of roll film motion.

9. The apparatus as set forth in any of claims 5, 6, 7 or 8, wherein each of said first and second folding and guiding means include a pair of spaced apart shoulders.

10. The apparatus as set forth in claim 9, wherein said shoulders are provided on a U-shaped bracket, pivotally connected to said bracket.

* * * * *